No. 702,622. Patented June 17, 1902.
S. G. BROWN.
ELECTRIC TELEGRAPHY.
(Application filed June 15, 1901.)
(No Model.)
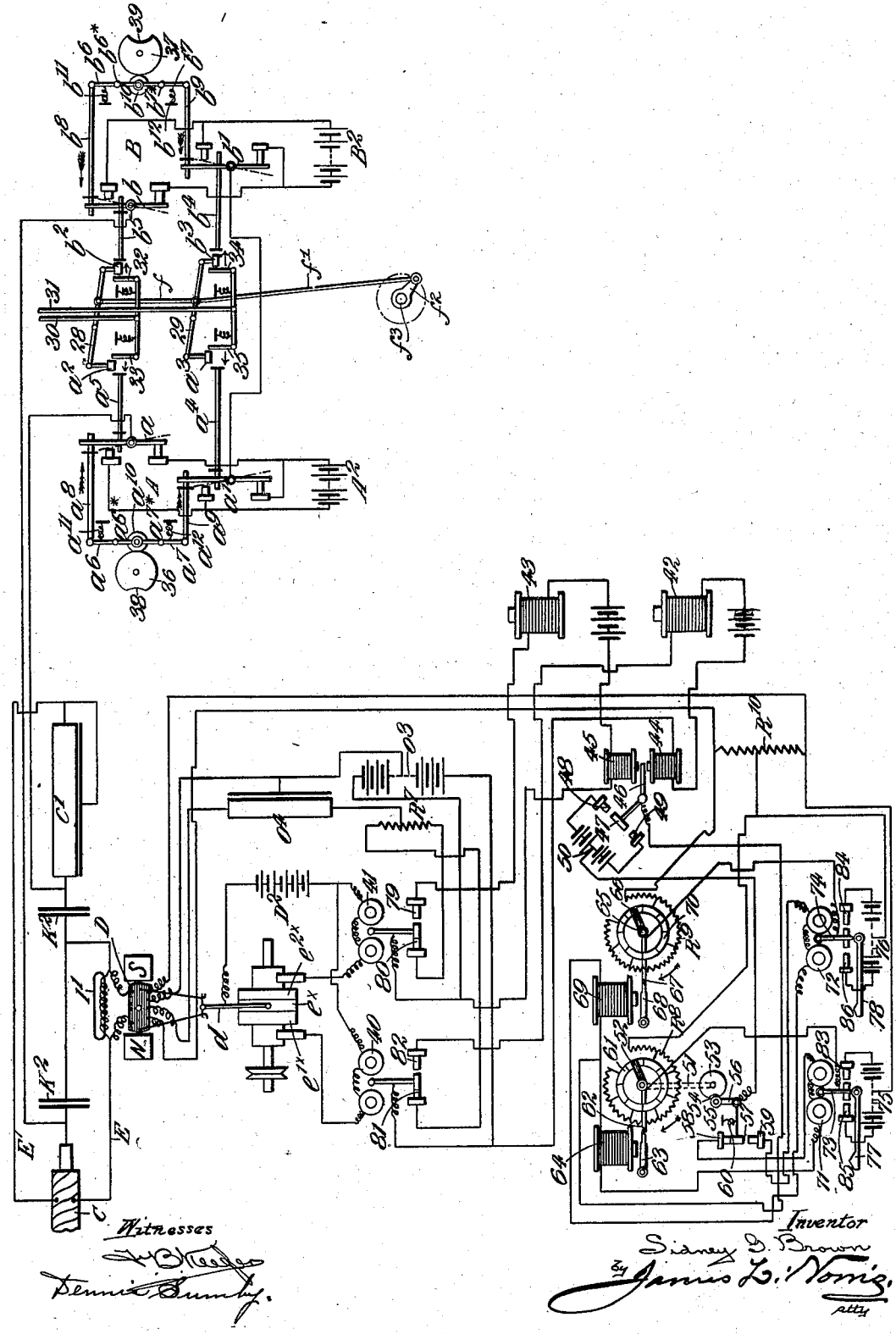

UNITED STATES PATENT OFFICE.

SIDNEY GEORGE BROWN, OF PUTNEY, ENGLAND.

ELECTRIC TELEGRAPHY.

SPECIFICATION forming part of Letters Patent No. 702,622, dated June 17, 1902.

Original application filed November 5, 1900, Serial No. 35,541. Divided and this application filed June 15, 1901. Serial No. 64,733. (No model.)

*To all whom it may concern:*

Be it known that I, SIDNEY GEORGE BROWN, electrical engineer, a subject of the King of Great Britain, residing at 9 Putney Hill, Putney, in the county of London, England, have invented certain new and useful Improvements Relating to Electric Telegraphy, of which the following is a specification.

This invention relates to improvements in electric telegraphy, more especially applicable to submarine-cable circuits, and has for its object to increase the number of signals that may be transmitted over such a circuit in any given time.

According to my invention I may employ two or more transmitters, preferably automatic transmitters, at one end of the cable or line, which may at the same time respectively operate two or more receivers at the far end of the cable or line, each transmitter working its receiver without interfering with the other receiver. Such a system is termed "diplex telegraphy," and if the system is duplexed it is termed "quadruplex telegraphy."

What is technically known as the "overlapping" of signals, or the interference of a signal by the immediately-following signal, takes place in long cable-sections to such an extent that the received signals cannot be readily recognized. My receiving apparatus may be readily arranged to effectively overcome the overlapping of received signals. This enables me to intentionally work the two transmitting instruments, so as to send signals out of phase and at such a speed as to overlap each other, and thereby obtain an increased speed of signaling. As soon as the first signal arrives it moves the pointer or tongue of a receiving-relay, thereby operating a secondary relay and a recording instrument and also liberating a suitable clutch mechanism carrying a contact-maker having subdivisions connected to resistances, capacity, or induction or any required combination of these, and hereinafter referred to as a "sweeper." This sweeper is adapted to then send a current through the suspended coil of the receiving-relay and through the resistances, capacity, or induction or any combination of these, so as to neutralize the effect of the last part of the signaling-current on the coil of the said receiving-relay. The next or following signal will therefore be free from any overlapping effect exerted by the first signal on the primary relay-coil and will in its turn work the receiving-relay, thereby registering its signal and also operating a sweeper, which neutralizes the effect of the last part of the signaling-current upon the coil of the receiving-relay. The number of rotations of the sweepers may have to be less than the number of the arrival signals, and it may therefore be necessary to provide one, two, or more sweepers to each receiving apparatus and to so arrange said sweepers that at least one of them is always ready to be operated by a signaling-current.

If the diplex system is to be of practical value, the signals as applied to the receiving-relay must be cleared of the secondary or disturbing electrical effect produced by the polarizing of the receiving-condenser produced by the receipt of a series or succession of signals all of the same polarity, which causes the tongue of the receiving-relay to tend to fall back toward zero, owing to part of the signaling-current having been lost in gradually charging up the receiving-condenser. For this purpose I employ a local correcting-circuit, including the receiving-relay and having resistance and capacity, such as an artificial line or a condenser, placed between two resistances, (the resistances and the condenser being capable of adjustment,) through which a correcting-current can be sent from the secondary relays or their equivalent and thence through the coil of the receiving-relay in order to produce the opposite effect upon the said coil to that produced by the charging up of the receiving-condenser.

Referring to the drawings, the cable and artificial line are arranged according to Harwood's method, in which the artificial line C' is made equal to the cable C in every respect. The two condensers $K^2 K^2$ are equal in every respect. The receiving-relay coil D, hereinafter described, is connected to a neutral point in the line as regards the sending-battery, but not to a neutral point with regard to the signaling-currents. This method of balancing the cable is well known and is described in Charles Bright on *Submarine*

*Telegraphs*, chapter 3, page 657, also in *Traite de Telegraphie Sous-Marine*, chapter XXI, page 533.

A and B are the transmitters, provided with signaling-levers $a\ a'$ and $b\ b'$.

C is the cable or line; C', the artificial line.

$K^2\ K^2$ are the receiving-condensers.

D is the coil of the receiving-relay, which is suspended in a magnetic field between the poles N and S of a magnet and which operates a tongue $d$ on a rotary contact.

I' is a closed-circuit magnetic coil arranged as a shunt to eliminate earth-currents from the coil D. This coil I' has a resistance of, say, thirty ohms, while the coil D has a resistance of, say, five hundred ohms. Therefore all slow-moving currents, such as earth-currents, flow through the coil I', and the coil D is thus cleared of this secondary or disturbing effect.

$A^2\ B^2$ are the transmitting-batteries, which are of the same signaling power and are adapted to work in series.

28 29 are rocking levers, pivoted at or about midway of their length.

$f$ is a link connecting the levers 28 29, and $f'$ is a rod connecting the lever 29 to a crank $f^2$, carried by a rotary shaft $f^3$, driven from any convenient source of power. As the shaft $f^3$ rotates, therefore, the levers 28 29 are caused to rock. The lever 28 carries depending blocks $a^2\ b^2$, and the lever 29 carries depending blocks $a^3\ b^3$.

30 and 31 are needles operated by a perforated traveling signaling-tape, as is well understood.

32 33 are crank-levers operated by the needle 30, and 34 35 are crank-levers operated by the needle 31. When, say, the lever 29 is in the position shown, if the needle 31 enters a perforation in the signaling-tape the levers 34 35 are moved in the direction shown by the arrows. The lever 34 strikes the block $b^3$, which in turn moves a sliding rod $b^4$, which pushes the signaling-lever $b'$ into the position shown in dotted line. A signaling-current then passes from the battery $B^2$ through the levers $b'\ a'\ a$, through C', earth E, and the coil D and returns by cable and the lever $b$ to the battery $B^2$. The lever 29 then rocks, so as to raise the block $b^3$ out of the path of the lever 34 and to lower the block $a^3$ into the path of the lever 35. The lever 29 then rocks at such a rate that if the needle 31 is then again operated by the signaling-tape the levers 34 35 are again moved in the direction indicated by the arrows and the lever 35 strikes the block $a^3$ and causes it to move a sliding rod $a^4$, so as to move the signaling-lever $a'$ into the position shown in dotted line. A signal can thus be sent from the battery $A^2$ through the lever $a$ C', earth E, and the coil D and back through cable and the levers $b,\ b'$, and $a'$ to the battery $A^2$ before the first signal is finished—that is to say, the signal sent from the battery $A^2$ overlaps the signal sent from the battery $B^2$. The needle 30 similarly operates the signaling-levers $a$ and $b$ through the intervention of the levers 32 33, the blocks $b^2\ a^2$, and the sliding rods $b^5\ a^5$. If therefore the signaling-tape is run at double the speed that is usual when employing a single automatic transmitter of ordinary construction, twice as many signals will be transmitted in a given time as when using such single transmitter.

$a^6\ a^7$ and $b^6\ b^7$ are levers pivoted, respectively, at $a^{6\times}\ a^{7\times}$ and $b^{6\times}\ b^{7\times}$.

$a^8\ a^9\ b^8\ b^9$ are sliding rods hinged to the levers $a^6\ a^7\ b^6\ b^7$. The other ends of the levers $a^6\ a^7\ b^6\ b^7$ are hinged to rollers $a^{10}\ b^{10}$, which bear on rotary disks 36 37, having recesses 38 39. As the disks 36 37 rotate the rollers $a^{10}\ b^{10}$ enter the recesses 38 39 once during every revolution. The levers $a^6\ a^7\ b^6\ b^7$ are then moved by springs $a^{11}\ a^{12}\ b^{11}\ b^{12}$, so as, if necessary, to cause the rods $a^8\ a^9\ b^8\ b^9$ to slide in the direction indicated by the arrows, and thus return the signaling-levers $a\ a'\ b\ b'$ to the position shown in full line.

The receiving-relay is provided with a rotary contact, which comprises a central insulated section $e^\times$ and conductive sections $e'^\times\ e^{2\times}$, arranged one on each side of the section $e^\times$.

40 and 41 are the secondary relays.

$O^3$ is the battery for sending a current through the coil D in the same direction to that in which the signaling-currents pass through said coil to correct the effect of the charging up of the condensers $K^2$ by the receipt of a series of signals of the same sign as above described.

$O^4$ is an artificial line comprising induction, capacity, or resistance or any combination of these and is included in the circuit of the battery $O^3$. The artificial line $O^4$ affords such retardation to the current from the battery $O^3$ as to damp down single signaling effects from said battery due to single reversals of the tongue $d$ and to make the combined effect of a series of signals of the same sign and each of which moves the tongue $d$ onto the same side of the rotary contact felt by the coil D. The artificial line $O^4$ should afford the same time retardation to currents from the battery $O^3$ as is afforded by the cable C and condenser $K^2$ to the signaling-currents from the transmitting-batteries. As therefore the condenser $K^2$ becomes gradually charged up by the receipt of a series of signals of the same sign, and thereby prevents a part of the signaling-current reaching the coil D, the battery $O^3$ sends a current through the signaling-coil D, which current is equal in effect to that part of the original signaling-current absorbed by the condenser $K^2$. The effect of the current from the battery $O^3$ therefore tends to move the coil D in opposition to the effect produced by the reduction of the signaling-current caused by the aforesaid charging up of the condenser $K^2$.

$R^7$ is a resistance-coil.

42 and 43 are the recording instruments.

44 is an electromagnet in the circuit of the recorder 42, and 45 is an electromagnet in the circuit of the recorder 43.

46 is a pivoted lever, one arm of which is situated between the magnets 44 and 45 and the other arm of which carries a contact 47, adapted to oscillate between contacts 48 49, connected to a divided battery 50.

51 is a rotary clutch-shaft carrying a brush or sweeper 52 and a roller 53, provided with a recess 54, with which a roller 55, carried by one arm of a lever 56, normally engages. The other arm of the lever 56 carries a contact 57, which is adapted to oscillate between contacts 58 59 and is normally held against the contact 58 by a spring 60. The brush or sweeper 52 bears on and is adapted to sweep over the surface of a contact-ring 61, subdivided into sections which are insulated from one another and are connected to resistances $R^8$. The shaft 51 carries a radial pin 62, which is normally engaged by the armature 63 of an electromagnet 64, included in the circuit of the battery 50.

65 is a rotary clutch-shaft which carries a brush or sweeper 66 and is also provided with a radial pin 67, which is normally engaged by the armature 68 of an electromagnet 69, included in the circuit of the battery 50. The sweeper 66 bears upon a contact-ring 70, divided into subdivisions which are insulated from one another and are connected to resistances $R^9$.

71 and 72 are relays, the tongues 73 74 of which are adapted to open and close the circuits of divided batteries 75 76.

77 78 are springs carrying rollers which hold the tongues 73 74 in the position shown in full line when the relays 71 72 are not energized.

The circuits of the batteries 75 76 include the sweepers 52 66, the resistances $R^8$ and $R^9$, a resistance $R^{10}$, and a winding on the coil D, said winding being in the opposite direction to the winding through which the signaling-currents and the currents from the battery $O^3$ pass.

When a signaling-current causes the coil D to move and slide the tongue $d$, say, onto the section $e^{2x}$ of the rotary drum, the circuit of the battery $D^2$ is closed and a current passes from one pole of the said battery through the relay 41 and returns by the section $e^{2x}$ and the tongue $d$ to the other pole of said battery. The tongue of the relay is thereby moved against the stop 79, thus closing the circuit of the recorder-magnet 43, so that a current passes from the battery of said recorder through the magnet 43, the tongue of the relay 41, and the electromagnet 45 back to the battery of the magnet 43. A signal is thus recorded by the recorder 43, the magnet 45 is energized, and a current for correcting the effect of the charging up of the condenser $K^2$ by a series of signals of the same sign on the coil D passes from the battery $O^3$ through the tongue of the relay 40, the contact 81, the artificial line $O^4$, through a winding on the coil D in the same direction to that in which the signaling-current has passed, and back to the battery $O^3$. When the magnet 45 is energized, it attracts the armature 46 and closes the contacts 47 49. A current then passes from the battery 50 through the contacts 49 47, energizes the magnet 64, operates the relay 71, so as to move the tongue 73 against the stop 83, and then passes back through the contacts 58 57 and the lever 56 to the battery 50. The magnet 64 attracts the armature 63 and releases the pin 62, so that the shaft 51, with the sweeper 52 and the roller 53, is permitted to rotate. A current then passes from the battery 75 through the contact 83, the tongue 73, the sweeper 52, the contact 61, the resistances $R^8$, the resistance $R^{10}$, through the winding on the coil D, which is wound in the opposite direction to the winding of said coil through which the signaling-current passes, and then back to the battery 75, thereby neutralizing the effect of the last part of the signaling-current on the coil D, so that the following signal will be free from any overlapping action by the last part of the preceding signal, the resistances $R^8$ gradually tapering off the effect of the neutralizing-current on the coil D in the same manner as the overlapping signals taper off. Directly the shaft 51 is released, as above described, and begins to rotate the roller 53 forces the roller 55 out of the recess 54, thereby rocking the lever 56 and closing the contacts 57 59. The armature 63 is then released and lies in the path of the pin 62, so as to engage said pin again when the shaft 57 has made one complete revolution, the tongue 73 also breaking contact with the stop 83. This closing of the contacts 57 59 throws the electromagnet 69 into the circuit of the battery 50, so that when the next signal is received and causes the tongue $d$ to be moved onto, say, the section $e^{2x}$ the tongue of the relay 41 is again moved onto the stop 79, a signal is recorded by the recorder 43, a correcting-current for counteracting the effect of the charging up of the condenser $K^2$ by a series of signals of the same sign is sent through the coil D from the battery $O^3$, the electromagnet 45 is energized, and the contacts 47 49 are closed, as above described. A current then passes from the battery 50 through the contacts 47 49, energizes the magnet 69, passes through the relay 72, causing the tongue 74 to move against the stop 84, and returns through the contacts 59 57 and lever 56 to the battery 50. The magnet 69 attracts the armature 68, thereby releasing the pin 67 and permitting the shaft 65, with the sweeper 66, to rotate. A current for neutralizing the effect of the last part of this signal on the coil D then passes from the battery 76 through the contact 84, the tongue 74, the sweeper 66, the resistances $R^9$, through the winding of the coil D, which is wound in the opposite direction to the winding through which the signaling-current passes, and back through the resistance $R^{10}$ to the battery 76. It will thus be readily understood that the last part of every signaling impulse received is neutralized and cannot, therefore, overlap or interfere with the succeeding signaling impulse, while if another signal is received before one of the sweepers has completed its rotation such signal will be dealt with by the other sweeper, and there need thus be no delay in receiving and registering the signals as fast as they are transmitted. It is obvious that if a signal of opposite sign is received and causes the tongue $d$ to be moved onto the section $e'^{\times}$ of the rotary drum that the tongue of the relay 40 will be moved against the stop 82, thus energizing the magnet of the recorder 42, so as to record the signal, energizing a magnet 44, and causing a current for correcting the effect on the coil D of the charging up of the condenser $K^2$ by a series of signals of the same sign to be sent from the battery $O^3$ through the winding of the coil D in the same direction as the winding of said coil through which the signaling-current passes and back through the artificial line $O^4$, the contact 80, and tongue of the relay 41 to the battery $O^3$. The magnet 44 then attracts the armature 46 and closes the contacts 47 48, thus closing the circuits of one or other of the magnets 64 or 69 and operating the sweepers, the contact-lever 56, and the relays 71 and 72, as above described, it being understood that in this case the tongues 73 74 of the relays 71 72 would be moved against their stops 85 or 86 and the direction of the neutralizing-current be thereby reversed. When no signals are received, no currents are sent through the coil D from the batteries $O^3$, 75, or 76, as will be understood from the drawings.

What I claim, and desire to secure by Letters Patent of the United States, is—

1. In a system of electric telegraphy, the combination with the line or cable, of a pair of transmitting-batteries, automatic transmitting instruments adapted to control said batteries so as to send signals out of phase or which "overlap," means for receiving said signals, means for neutralizing the effect of the last part of each signal upon the said receiving means so that each signal shall be free from any overlapping effect from its preceding signal, and means for recording said signals, substantially as described.

2. In a system of electric telegraphy, the combination with the line or cable, of a pair of transmitting-batteries, two pairs of signaling-levers adapted to control said batteries in series with one another, a pair of rocking arms interposed between the signaling-levers, a pair of signaling-needles, pivoted cranked levers having their ends at one extremity connected to said signaling-needles, blocks depending from the ends of the rocking arms, sliding rods adapted to be moved by said depending blocks so as to operate the signaling-levers for closing the battery-circuits, means for returning said levers so as to open the battery-circuits after being thus operated, means for receiving the signals, means for neutralizing the effect of the last part of each signal upon the said receiving means so that each signal shall be free from any overlapping effect from the preceding signal, and means for recording said signals, substantially as described.

3. In a system of electric telegraphy, the combination with the line or cable, of a pair of transmitting-batteries, automatic transmitting instruments adapted to control said batteries so as to send signals which are out of phase or which "overlap," a receiving-condenser, a receiving-relay operated by such signals, means operated by the receiving-relay for neutralizing the effect of the last part of every received signaling-current on the coil of said relay, means also operated by said receiving-relay for overcoming the effect on said relay-coil caused by the charging up of the receiving-condenser by a series of signals of the same sign, and means for recording the signals, substantially as described.

4. In a system of electric telegraphy, the combination with the line or cable, of a pair of transmitting-batteries, transmitting instruments adapted to control said batteries so as to send signals which are out of phase or "overlap," a receiving-relay operated by such signals, secondary relays operated by the receiving-relay, recording instruments operated by the secondary relays and adapted to respectively record the positive and negative signals received, an electromagnet in the circuit of each recording instrument, a divided battery, an armature operated by said electromagnets for closing the circuit of one or other half of the divided battery when signals are recorded, and means included in the circuits of said divided battery for neutralizing the effect of the last part of every received signaling-current on the coil of the receiving-relay so that each signal shall be free from any overlapping effect from the preceding signal, substantially as described.

5. In a system of electric telegraphy, the combination with the line or cable, of a pair of transmitting-batteries, transmitting instruments adapted to control said batteries so as to send signals which are out of phase or "overlap," a receiving-condenser, a receiving-relay operated by such signals, secondary relays operated by the receiving-relay, means operated by said secondary relays for sending a current through the coil of said receiving-relay to overcome the effect caused by the charging up of the receiving-condenser by a series of signals of the same sign, recording instruments operated by the secondary relays and adapted to respectively record the positive and negative signals received, an electromagnet in the circuit of each recording instrument, a divided battery, an armature operated by said electromagnets for closing the circuit of one or other half of the divided battery when signals are recorded, and means for neutralizing the effect of the last part of every received signaling-current on the coil of the receiving-relay so that each signal shall be free from any overlapping effect from the preceding signal, substantially as described.

6. In a system of electric telegraphy, the combination with the line or cable, of a pair of transmitting-batteries, transmitting instruments adapted to control said batteries so as to send signals which are out of phase or which "overlap," a receiving-relay operated by said signals, recording instruments for recording said signals, a pair of rotatable shafts, sweepers carried by said shafts, sectional ring-contacts over which said sweepers are adapted to sweep, batteries in the sweeper-circuits, a winding on the coil of the receiving-relay included in the sweeper-circuits, means connected to the sections of the ring-contacts and included in the sweeper-circuits for affecting the currents sent through the sweeper-circuits so as to neutralize the effect of the last part of every signal on the coil of the receiving-relay, means for normally holding the rotatable shafts stationary, electrical means operated by the receiving-relay for releasing one of the rotatable shafts when a signal is received, and means operated by the rotatable shafts whereby the circuit of the means for releasing one rotatable shaft is closed while the other rotatable shaft is completing a revolution, substantially as described for the purpose specified.

7. In a system of electric telegraphy, the combination with the line or cable, of a pair of transmitting-batteries, transmitting instruments adapted to control said batteries so as to send signals out of phase or which "overlap," a receiving-relay operated by said signals, secondary relays operated by the receiving-relay, recording instruments operated by the secondary relays and adapted to respectively record the positive and negative signals received, a pair of rotatable shafts, sweepers carried by said shafts, sectional ring-contacts over which said sweepers are adapted to sweep, batteries in the sweeper-circuits, a winding on the coil of the receiving-relay included in the sweeper-circuits, means connected to the sections of the ring-contacts and included in the sweeper-circuits for affecting the currents sent through the sweeper-circuits so as to neutralize the effect of the last part of every signal on the coil of the receiving-relay, means for normally holding the rotatable shafts stationary, electrical means operated by the secondary relays for releasing one of the rotatable shafts and closing the circuit of its sweeper-battery when a signal is received, and means operated by the rotatable shafts whereby the circuit of the means for releasing one rotatable shaft is closed while the other rotatable shaft is completing its revolution, substantially as described for the purpose specified.

8. In a system of electric telegraphy, the combination with the line or cable, of a pair of transmitting-batteries, a pair of transmitting instruments adapted to control said batteries so as to send signals which are out of phase or which "overlap," a receiving-relay operated by said signals, secondary relays operated by the receiving-relay, recording instruments operated by the secondary relays and adapted to respectively record the positive and negative signals received, an electromagnet in the circuit of each recording instrument, a divided battery, an armature operated by said electromagnets so as to close the circuit of one or other half of said divided battery when signals are recorded, a pair of rotatable shafts, sweepers carried by said shafts, sectional ring-contacts over which said sweepers are adapted to sweep, means connected to the sections of the ring-contacts and included in the sweeper-circuits for affecting the currents sent through the sweeper-circuits so as to neutralize the last part of every signal on the coil of the receiving-relay, radial pins carried by said rotatable shafts, armatures adapted to normally engage said radial pins, electromagnets in the circuits of the said divided battery for operating said armatures so as to release one or other of the rotatable shafts when a signal is received, a contact-maker in the circuit of said divided battery, means operated by one of the rotatable shafts for actuating said contact-maker so as to close the circuit of that electromagnet in the divided battery-circuit which controls the armature engaging the radial pin on one of the rotatable shafts, until the other of said rotatable shafts has completed a revolution, a split battery included in each of the sweeper-circuits, a winding on the coil of the receiving-relay included in the sweeper-circuits, and relay instruments included in the circuit of the first-mentioned divided battery and adapted to close the circuits of the split batteries in the sweeper-circuits, substantially as described.

9. In a system of electric telegraphy, the combination with the line or cable, of a pair of transmitting-batteries, a pair of transmitting instruments adapted to control said batteries so as to send signals which are out of phase or which "overlap," a receiving-condenser, a receiving-relay operated by said signals, secondary relays operated by the receiving-relay, means operated by said secondary relays for sending a current through the coil of the said receiving-relay to overcome the effect caused by the charging up of the receiving-condenser by a series of signals of the same sign, recording instruments operated by the secondary relays and adapted to respectively record the positive and negative signals received, an electromagnet in the circuit of each recording instrument, a divided battery, an armature operated by said electromagnets so as to close the circuit of one or other half of said divided battery when signals are recorded, a pair of rotatable shafts, sweepers carried by said shafts, sectional ring-contacts over which said sweepers are adapted to sweep, means connected to the sections of the ring-contacts and included in the sweeper-circuits for affecting the currents sent through the sweeper-circuits so as to neutralize the last part of every signal on the coil of the receiving-relay, radial pins carried by said rotatable shafts, armatures adapted to normally engage said radial pins, electromagnets in the circuit of the said divided battery for operating said armatures so as to release one or other of the rotatable shafts when a signal is received, a contact-maker in the circuit of said divided battery, means operated by one of the rotatable shafts for actuating said contact-maker so as to close the circuit of that electromagnet in the divided battery-circuit which controls the armature engaging the radial pin on one of the rotatable shafts, until the other of said rotatable shafts has completed a revolution, a split battery included in each of the sweeper-circuits, a winding on the coil of the receiving-relay included in the sweeper-circuits, and relay instruments included in the circuit of the first-mentioned divided battery and adapted to close the circuits of the split batteries in the sweeper-circuits, substantially as described for the purpose specified.

In testimony whereof I have hereunto set my hand, in presence of two subscribing witnesses, this 10th day of May, 1901.

SIDNEY GEORGE BROWN.

Witnesses:
A. E. RODDIS,
W. J. SKERTEN.